US012677189B2

(12) United States Patent
Freda et al.

(10) Patent No.: US 12,677,189 B2
(45) Date of Patent: Jul. 7, 2026

(54) MULTIPATH SCHEDULING

(71) Applicant: InterDigital Patent Holdings, Inc., Wilmington, DE (US)

(72) Inventors: Martino Freda, Laval (CA); Tuong Hoang, Montreal (CA); Jaya Rao, Montreal (CA); Oumer Teyeb, Montreal (CA); Tao Deng, Roslyn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 300 days.

(21) Appl. No.: 18/702,649

(22) PCT Filed: Oct. 18, 2022

(86) PCT No.: PCT/US2022/047022
§ 371 (c)(1),
(2) Date: Apr. 18, 2024

(87) PCT Pub. No.: WO2023/069434
PCT Pub. Date: Apr. 27, 2023

(65) Prior Publication Data
US 2024/0422617 A1 Dec. 19, 2024

Related U.S. Application Data

(60) Provisional application No. 63/257,462, filed on Oct. 19, 2021.

(51) Int. Cl.
*H04W 72/56* (2023.01)
*H04L 47/32* (2022.01)
(Continued)

(52) U.S. Cl.
CPC ......... *H04W 28/0278* (2013.01); *H04L 47/32* (2013.01); *H04L 69/14* (2013.01);
(Continued)

(58) Field of Classification Search
None
See application file for complete search history.

(56) References Cited

U.S. PATENT DOCUMENTS

| | | |
|---|---|---|
| 2017/0353819 A1 | 12/2017 | Yin et al. |
| 2019/0166640 A1 | 5/2019 | Wei et al. |
| 2020/0029353 A1 | 1/2020 | Xu et al. |
| 2021/0037503 A1 | 2/2021 | Nam et al. |

(Continued)

OTHER PUBLICATIONS

Huawei et al., "UE Aggregation", 3GPP Tdoc RWS-210451, 3GPP TSG RAN Meeting #92-e, Electronic Meeting, Jun. 14-18, 2021, 4 pages.

(Continued)

*Primary Examiner* — Jay L Vogel
(74) *Attorney, Agent, or Firm* — Flaster Greenberg, P.C.

(57) ABSTRACT

Methods, apparatuses, and procedures for scheduling of multipath relays in wireless communications are disclosed. For example, a method implemented in a wireless transmit/receive unit (WTRU) includes determining that data to be transmitted has a priority greater than a priority threshold; determining timing information associated with a selected set of resources for transmitting the data, and the timing information indicates a time resource for transmitting the data is less than a time resource threshold; transmitting, to a network entity, a first message including information indicating a buffer status associated with the data and the timing information associated with the selected set of resources; and transmitting, to a relay WTRU on a sidelink transmission, a second message including information indicating the buffer status.

20 Claims, 8 Drawing Sheets

Multipath Scheduling

Direct Link
+ Power
- Latency

Relay Link
+ Latency
- Power

(51) Int. Cl.

| | |
|---|---|
| *H04L 69/14* | (2022.01) |
| *H04W 28/02* | (2009.01) |
| *H04W 40/22* | (2009.01) |
| *H04W 72/0446* | (2023.01) |
| *H04W 72/21* | (2023.01) |
| *H04W 88/04* | (2009.01) |

(52) U.S. Cl.
CPC ....... *H04W 28/0268* (2013.01); *H04W 40/22* (2013.01); *H04W 72/0446* (2013.01); *H04W 72/21* (2023.01); *H04W 72/56* (2023.01); *H04W 88/04* (2013.01)

(56) References Cited

U.S. PATENT DOCUMENTS

| | | | | |
|---|---|---|---|---|
| 2022/0346163 A1* | 10/2022 | Damnjanovic | ....... | H04W 76/15 |
| 2023/0077735 A1* | 3/2023 | Ji | ....... | H04B 7/18513 |
| | | | | 370/329 |
| 2023/0103205 A1* | 3/2023 | Guo | ....... | H04W 72/21 |
| | | | | 370/329 |
| 2023/0276476 A1* | 8/2023 | Zhang | ....... | H04W 72/04 |
| | | | | 370/329 |

OTHER PUBLICATIONS

3rd Generation Partnership Project, Technical Specification Group Radio Access Network; NR; NR and NG-RAN Overall Description; Stage 2, Release 16, 3GPP TS 38.300 v16.1.0, Mar. 2020, 133 pages.

Huawei, et al., "Views on Rel-18 sidelink relay enhancements", 3GPP Tdoc RP-212291, 3GPP TSG RAN Meeting #93-e, Electronic Meeting, Sep. 13-17, 2021, 4 pages.

"New SID: Study on NR sidelink relay", Tdoc RP-193253, 3GPP TSG RAN Meeting #86, Sitges, Spain, Dec. 9, 2019, 5 pages.

3rd Generation Partnership Project (3GPP), "Technical Specification Group Radio Access Network; Study on further enhancements to LTE Device to Device (D2D), User Equipment (UE) to network relays for Internet of Things (IOT) and wearables; (Release 15)", 3GPP TR 36.746 V15.1.1, Apr. 2018, 55 pages.

Third Generation Partnership Project., "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0, Dec. 2018, 363 pages.

* cited by examiner

MULTIPATH SCHEDULING

CROSS-REFERENCE TO RELATED APPLICATION(S)

This application is a U.S. National Stage Application under 35 U.S.C. 371 of International Patent Application No. PCT/US2022/047022, filed Oct. 18, 2022, which claims priority to and the benefit of U.S. Provisional Application No. 63/257,462 filed in the U.S. Patent and Trademark Office on Oct. 19, 2021, the entire contents of each of which being incorporated herein by reference as if fully set forth below in its entirety and for all applicable purposes.

BACKGROUND

In some cellular/wireless standards (e.g., 3GPP Release 16 and/or Release 17), continued evolution of 5G New Radio (NR) may continue to optimize and enhance performance for wireless communications. For example, 3GPP Release 17 study on NR sidelink (SL) relay will study the use of both WTRU (or UE) to network relays and WTRU to WTRU (or UE to UE) relays based on PC5 (sidelink) interface. In an example (such as RP-193253-New SID: Study on NR sidelink relay), 3GPP Release 17 study on NR sidelink (SL) relay is based on study item justification/objectives.

In 3GPP Release 16, a first version of NR SL has been developed and solely focuses on supporting vehicle to everything (V2X)-related road safety services. The design aims to provide support for broadcast, groupcast and unicast communications in both out-of-coverage and in-network coverage scenarios. On top of that, sidelink-based relaying functionality may be additionally studied in order for sidelink/network coverage extension and power efficiency improvement, considering wider range of applications and services.

For example, to further explore coverage extension for sidelink-based communications, some current implementations for WTRU-to-network coverage extension and WTRU-to-WTRU coverage extension are discussed.

WTRU-to-Network coverage extension: Uu coverage reachability is necessary for WTRUs to reach a server in PDN network or a counterpart WTRU that is out of proximity area. However, in Release 13 for example, solution(s) on WTRU-to-Network relay is limited to EUTRA-based technology, and thus may not be applied to an NR-based system, for example, an NR-based system including both NG-RAN and NR-based sidelink communications.

WTRU-to-WTRU coverage extension: In some current implementations, proximity reachability is limited to a single-hop SL link, either via EUTRA-based or NR-based SL technology. However, the current approach is not sufficient in the scenario where there is no Uu coverage, considering the limited single-hop SL coverage.

As such, SL connectivity may be desired to be further extended (e.g., in an NR framework) in order to support the enhanced quality of service (QOS) requirements, for example, in a 5G NR system or beyond.

SUMMARY

Embodiments disclosed herein generally relate to communication networks, wireless and/or wired. One or more embodiments disclosed herein are related to methods, apparatuses, and procedures for sidelink (SL) relays, for example, scheduling for multipath relays in wireless communications. For example, methods and apparatuses for scheduling in multipath wireless transmit/receive unit (WTRU) to Network relays in a New Radio (NR) system are provided.

In one embodiment, an SL remote WTRU sends a buffer status specific to mode 2 data transmissions to the gNB, and informs a relay WTRU of such, based on the priority of the data and the timing of the selected mode 2 resources. For example, the SL remote WTRU may be configured with a threshold priority level, and threshold time remainder in the resource selection window (i.e. time difference between PDB and the selected resource). If data arrives for one or more logical channels with priority greater than the threshold, and resource selection selects resources for that data such that the threshold time remaining is less than a threshold. The SL remote WTRU may send a MAC CE to the gNB, containing the mode 2 data buffer status for the configured LCHs, and the timing of the selected resource, to the gNB. The SL remote WTRU may include the mode 2 data buffer status in the sidelink transmission to the relay WTRU.

In another embodiment, an SL relay WTRU may compensate SR/BSR for data to be relayed to the gNB based on indication from the remote WTRU. For example, the SL relay WTRU may be configured with an adaptation layer mapping ingress LCHs to egress LCHs. Upon reception of buffer status for mode 2 data from a remote WTRU, the SL relay WTRU may cancel any SR that would be triggered by data arrival at egress LCH(s) mapped to the ingress LCH IDs indicated in the buffer status. The SL relay WTRU may subtract an amount of data, from any future BSR for each egress LCH, corresponding to the amount of data indicated in the in the buffer status received from the remote WTRU. The SL relay WTRU may transmit BSR (based on legacy triggers) containing the compensated amount of data.

In one embodiment, an SL remote WTRU may inform the gNB about the periodicity and offset of selected mode 2 resources for transmission to the relay WTRU. For example, the SL remote WTRU may be configured with a threshold priority level, and threshold time remainder in the resource selection window (i.e. time difference between PDB and the selected resource). The SL remote WTRU may perform periodic resource selection of data to be transmitted to a relay WTRU. If resource selection performed for the periodic data is associated with a priority level before the threshold and results in a time difference between the selected resource and the PDB which is below the threshold, the remote WTRU may provide indication of a periodic resource selection and the periodicity and offset of mode 2 selected resources to the gNB.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System, Networks, and Devices

The methods, procedures, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
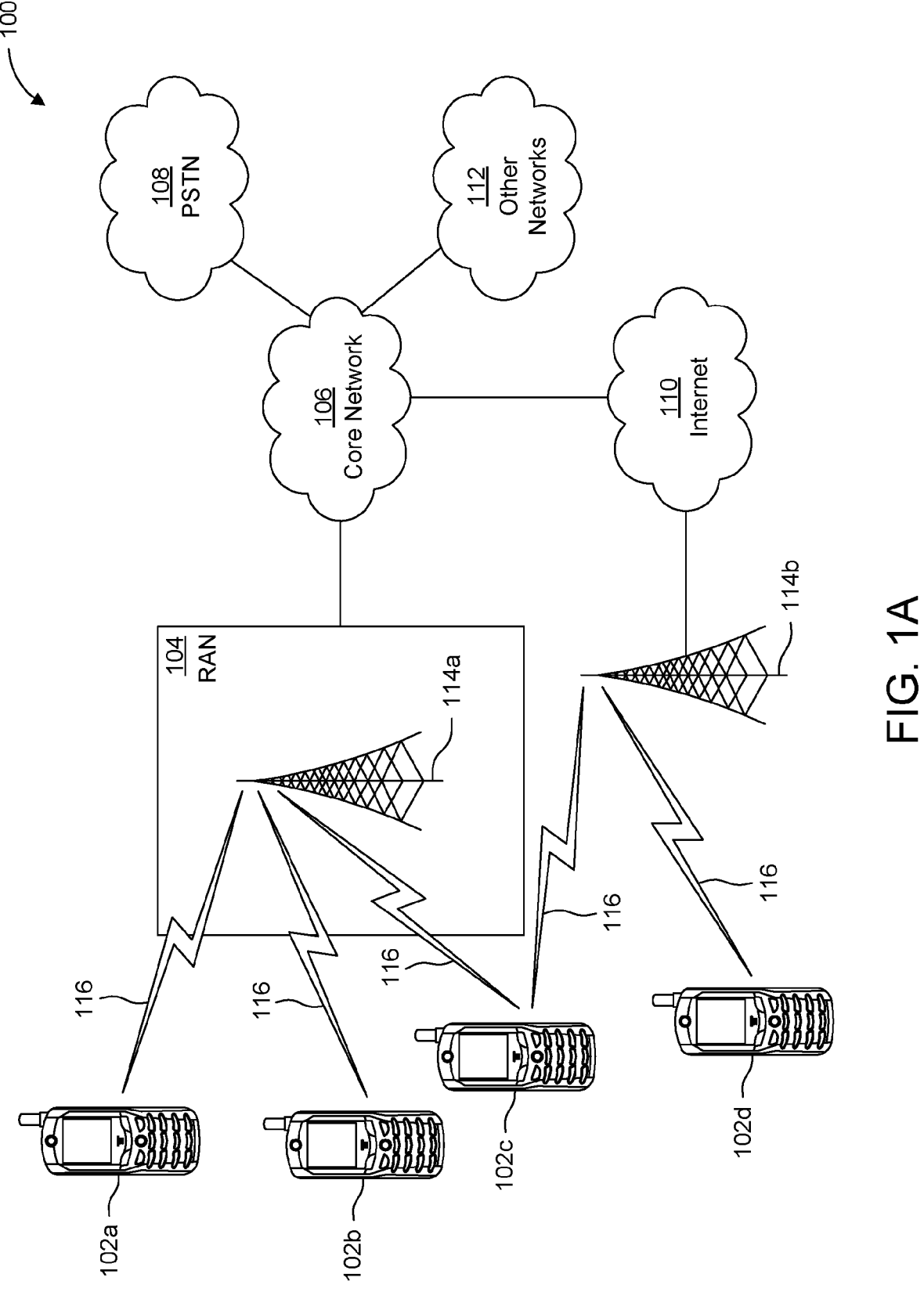
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
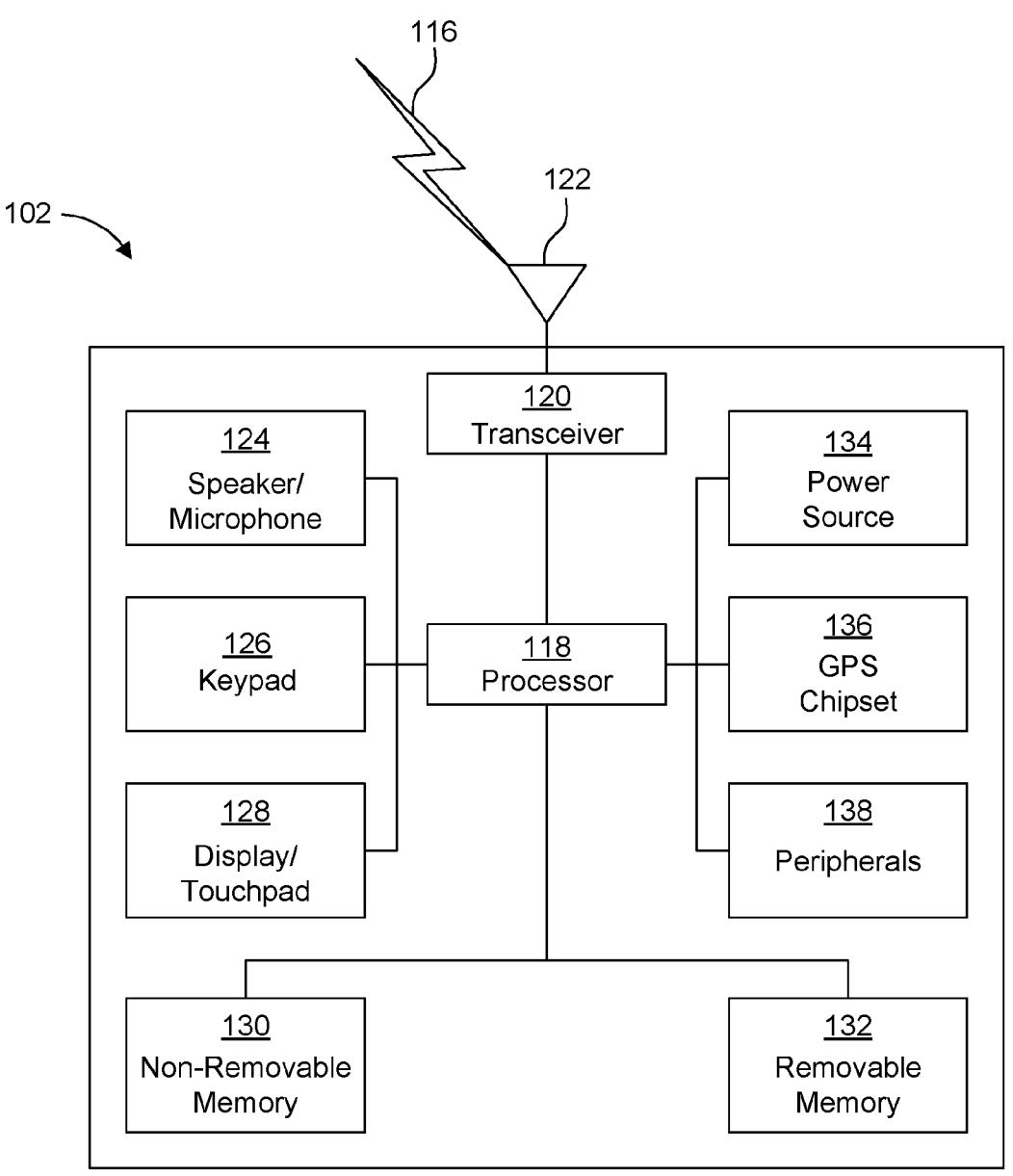
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
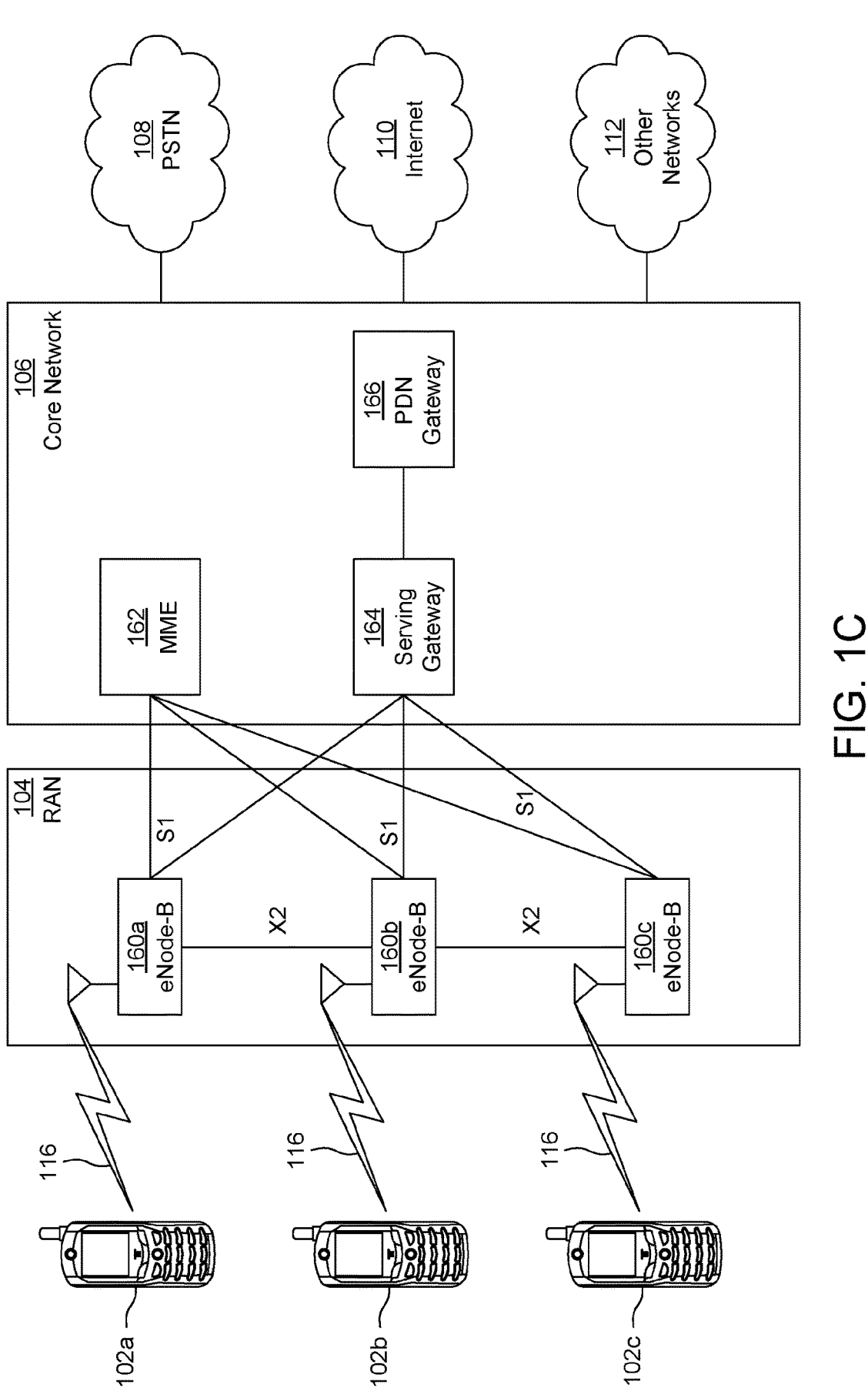
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
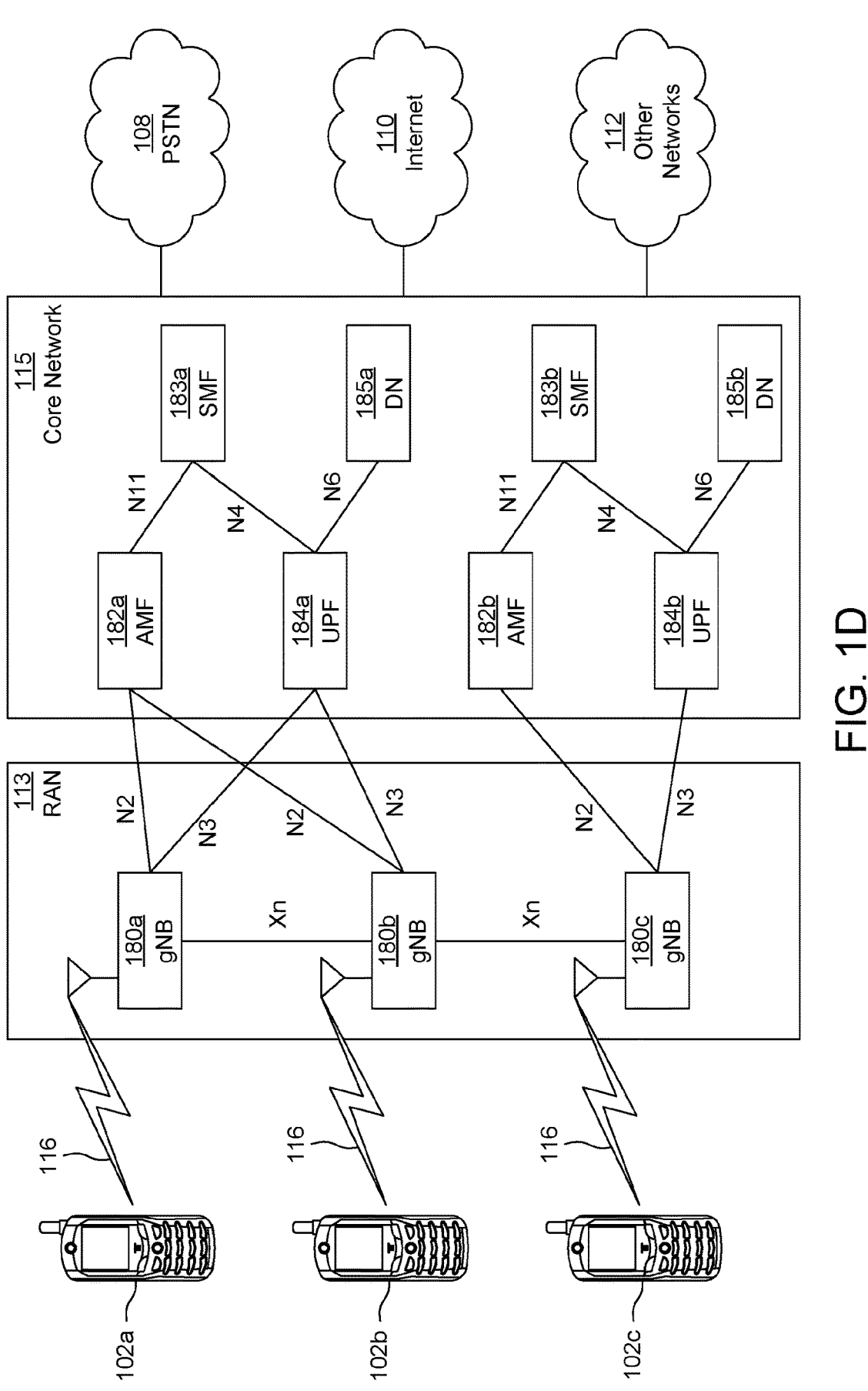
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allo- cating UE IP address, managing PDU sessions, controlling policy enforcement and QoS, providing downlink data noti- fications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Inter- net 110, e.g., to facilitate communications between the WTRUs 102*a*, 102*b*, 102*c* and IP-enabled devices. The UPF 184, 184*b* may perform other functions, such as routing and forwarding packets, enforcing user plane policies, support- ing multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding descrip- tion of FIGS. 1A-1D, one or more, or all, of the functions described herein with regard to any of: WTRUs 102*a*-*d*, base stations 114*a*-*b*, eNode-Bs 160*a*-*c*, MME 162, SGW 164, PGW 166, gNBs 180*a*-*c*, AMFs 182*a*-*b*, UPFs 184*a*-*b*, SMFs 183*a*-*b*, DNs 185*a*-*b*, and/or any other element(s)/ device(s) described herein, may be performed by one or more emulation elements/devices (not shown). The emula- tion devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communi- cation network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being imple- mented/deployed as part of a wired and/or wireless com- munication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

The detailed objectives of 3GPP Release 17 study item include study single-hop NR sidelink (SL) relays. For example, the Release 17 study item includes study mecha- nism(s) with minimum specification impact to support the requirements (e.g., Service and System Aspects (SA) requirements) for SL-based WTRU-to-Network and WTRU-to-WTRU relay, focusing on the following aspects (if applicable) for layer-3 relay and/or layer-2 relay [RAN2]: 1) Relay (re-)selection criterion and procedure; 2) Relay/ Remote WTRU authorization; 3) QoS for relaying function- ality; 4) Service continuity; 5) Security of relayed connec- tion after SA3 has provided its conclusions; 6) Impact on user plane protocol stack and control plane procedure, e.g., connection management of relayed connection. The Release 17 study item also includes study mechanism(s) to support upper layer operations of discovery model/procedure for SL relaying, assuming no new physical layer channel/signal [RAN2].

The study shall take into account of further input from SA WGs, e.g., SA2 and SA3, for the discussed items above (if applicable). It is assumed that WTRU-to-Network relay and WTRU-to-WTRU relay use a same relaying solution or method. Forward compatibility for multi-hop relay support in a future release needs to be taken into account. For layer-2 WTRU-to-Network relay, the architecture of end-to-end PDCP and hop-by-hop RLC, e.g., as recommended in TR 36.746, is taken as starting point.

WTRU-to-Network Relays in 3GPP Release 13

Relaying via ProSe WTRU to Network relays was intro- duced in Release 13 to extend network coverage to an out of coverage WTRU by using PC5 (device-to-device or D2D) between an out of coverage WTRU and a WTRU-to-Net- work relay (see, e.g., 3GPP TS 36.300):

"A ProSe UE-to-Network Relay provides a generic L3 forwarding function that can relay any type of IP traffic between the Remote UE and the network. One-to-one and one-to-many sidelink communications are used between the Remote UE(s) and the ProSe UE-to-Network Relay. For both Remote UE and Relay UE only one single carrier (i.e., Public Safety ProSe Carrier) operation is supported (i.e., Uu and PC5 should be same carrier for Relay/Remote UE). The Remote UE is authorized by upper layers and can be in-coverage of the Public Safety ProSe Carrier or out-of- coverage on any supported carriers including Public Safety ProSe Carrier for UE-to-Network Relay discovery, (re) selection and communication. The ProSe UE-to-Network Relay is always in-coverage of EUTRAN. The ProSe UE-to- Network Relay and the Remote UE perform sidelink com- munication and sidelink discovery as described in section 23.10 and 23.11 respectively."

Relay Selection for WTRU-to-Network (NW) Relays

Relay selection/reselection for ProSe WTRU-to-NW relays is performed based on combination of a AS layer quality measurements (e.g., RSRP) and/or upper layer criteria. This is described in more detail in the 3GPP stage 2 specifications, as follows (refer to 3GPP TS 36.300):

"The eNB controls whether the UE can act as a ProSe UE-to-Network Relay:

If the eNB broadcast any information associated to ProSe UE-to-Network Relay operation, then ProSe UE-to-Network Relay operation is supported in the cell;

The eNB may provide:

Transmission resources for ProSe UE-to-Network Relay discovery using broadcast signalling for RRC_IDLE state and dedicated signalling for RRC_CONNECTED state;

Reception resources for ProSe UE-to-Network Relay discovery using broadcast signalling;

The eNB may broadcasts a minimum and/or a maximum Uu link quality (RSRP) threshold(s) that the ProSe UE-to-Network Relay needs to respect before it can initiate a UE-to-Network Relay discovery procedure. In RRC_IDLE, when the eNB broadcasts transmission resource pools, the UE uses the threshold(s) to autonomously start or stop the UE-to-Network Relay discovery procedure. In RRC_CONNECTED, the UE uses the threshold(s) to determine if it can indicate to eNB that it is a Relay UE and wants to start ProSe UE-to-Network Relay discovery;

If the eNB does not broadcast transmission resource pools for ProSe-UE-to-Network Relay discovery, then a UE can initiate a request for ProSe-UE-to-Network Relay discovery resources by dedicated signalling, respecting these broadcasted threshold(s).

If the ProSe-UE-to-Network Relay is initiated by broadcast signalling, it can perform ProSe UE-to-Network Relay discovery when in RRC_IDLE. If the ProSe UE-to-Network Relay is initiated by dedicated signalling, it can perform relay discovery as long as it is in RRC_CONNECTED.

A ProSe UE-to-Network Relay performing sidelink communication for ProSe UE-to-Network Relay operation has to be in RRC_CONNECTED. After receiving a layer-2 link establishment request or TMGI monitoring request (upper layer message) [62] from the Remote UE, the ProSe UE-to-Network Relay indicates to the eNB that it is a ProSe UE-to-Network Relay and intends to perform ProSe UE-to-Network Relay sidelink communication. The eNB may provide resources for ProSe UE-to-Network Relay communication.

The remote UE can decide when to start monitoring for ProSe UE-to-Network Relay discovery. The Remote UE can transmit ProSe UE-to-Network Relay discovery solicitation messages while in RRC_IDLE or in RRC_CONNECTED depending on the configuration of resources for ProSe UE-to-Network Relay discovery. The eNB may broadcast a threshold, which is used by the Remote UE to determine if it can transmit ProSe UE-to-Network Relay discovery solicitation messages, to connect or communicate with ProSe UE-to-Network Relay UE. The RRC_CONNECTED Remote UE, uses the broadcasted threshold to determine if it can indicate to eNB that it is a Remote UE and wants to participate in ProSe UE-to-Network Relay discovery and/or communication. The eNB may provide transmission resources using broadcast or dedicated signalling and reception resources using broadcast signalling for ProSe UE-to-Network Relay Operation. The Remote UE stops using ProSe UE-to-Network Relay discovery and communication resources when RSRP goes above the broadcasted threshold.

NOTE: Exact time of traffic switching from Uu to PC5 or vice versa is up to higher layer.

The Remote UE performs radio measurements at PC5 interface and uses them for ProSe UE-to-Network Relay selection and reselection along with higher layer criterion [62]. A ProSe UE-to-Network Relay is considered suitable in terms of radio criteria if the PC5 link quality exceeds configured threshold (pre-configured or provided by eNB). The Remote UE selects the ProSe UE-to-Network Relay, which satisfies higher layer criterion and has best PC5 link quality among all suitable ProSe UE-to-Network Relays.

The Remote UE triggers ProSe UE-to-Network Relay reselection when:

PC5 signal strength of current ProSe UE-to-Network Relay is below configured signal strength threshold;

It receives a layer-2 link release message (upper layer message) from ProSe UE-to-Network Relay."

WTRU-to-Network Relays for Wearables

In 3GPP Release 14, a study for WTRU-to-NW relays for commercial use cases tailored to wearables and IoT devices was performed in RAN. While such study did not result in any specification, a technical report (TR) provided some preferred solutions for such relays. Contrary to ProSe WTRU-to-NW relays which uses a layer 3 (L3, IP layer) relaying approach, the WTRU-to-NW relays for wearables was expected to be a layer 2 (L2, MAC layer) relay based on the protocol stacks shown in FIG. 2 and FIG. 3 (also see, e.g., 3GPP TR 36.746).

Figure 2:
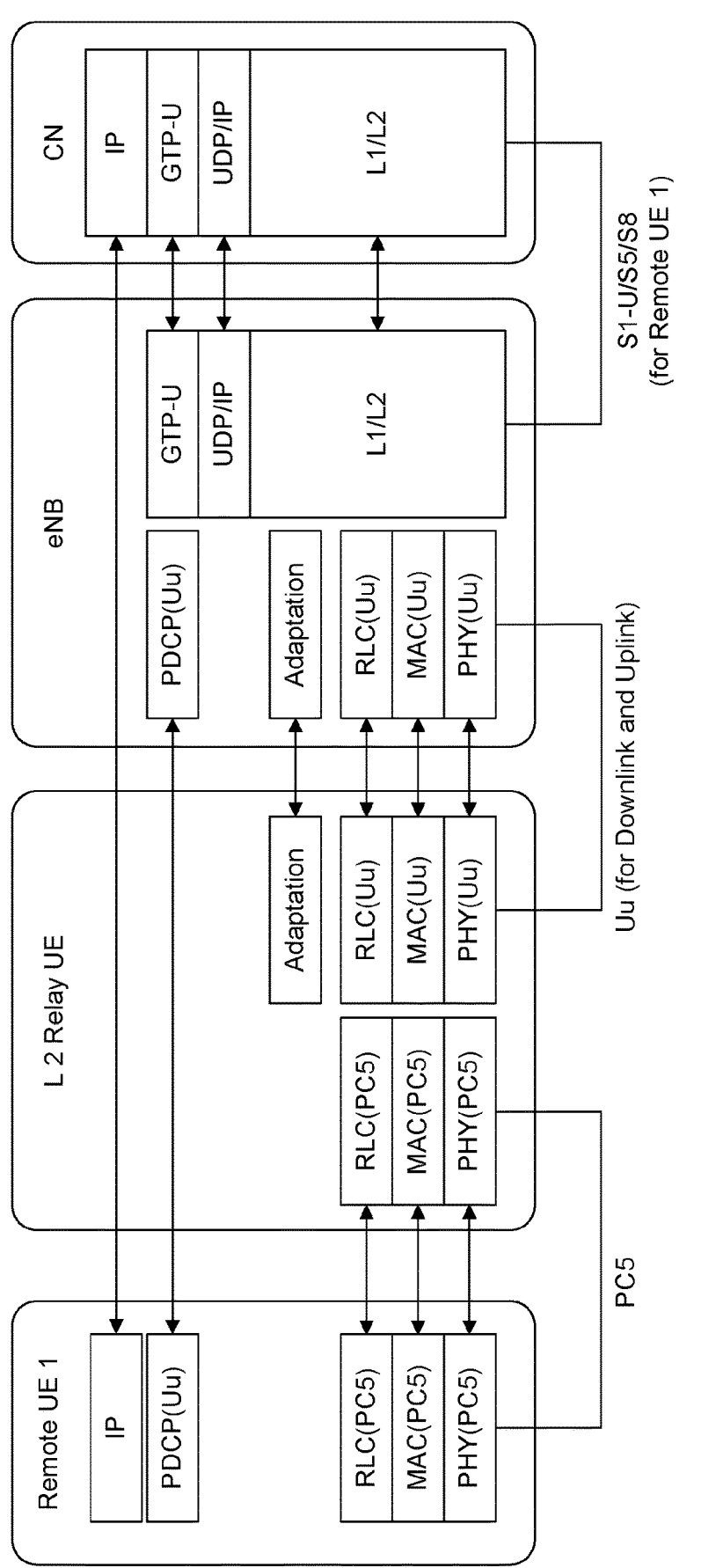
FIG. 2 is a diagram illustrating an example of a user-plane radio protocol stack for layer 2 evolved UE-to-Network relay (PC5), according to one embodiment.

Referring to FIG. 2, a User plane radio protocol stack for layer 2 evolved UE-to-Network relay (PC5) is provided.

Figure 3:
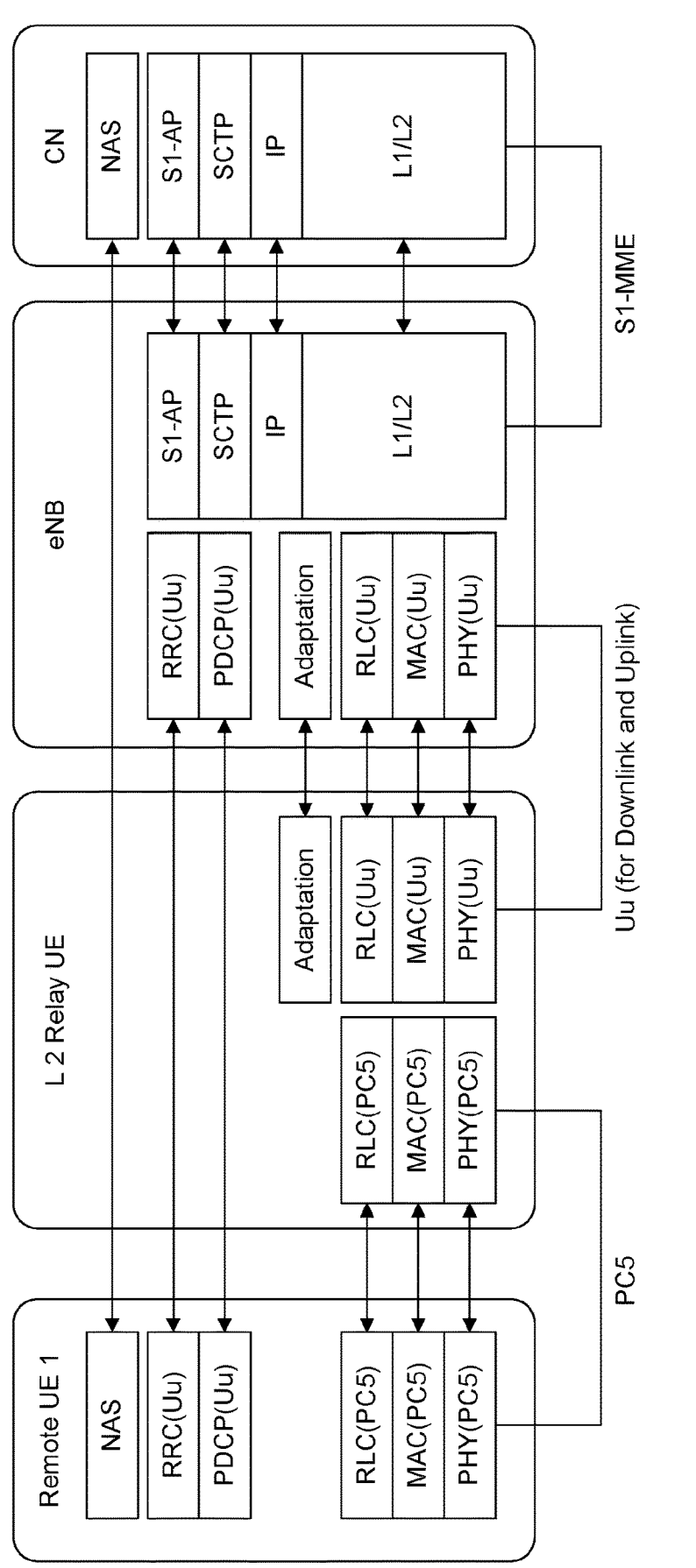
FIG. 3 is a diagram illustrating an example of a control-plane radio protocol stack for layer 2 evolved UE-to-Network relay (PC5), according to one embodiment.

Referring to FIG. 3, a Control plane radio protocol stack for layer 2 evolved UE-to-Network relay (PC5) is provided.

Connection Establishment for Unicast Links in NR V2X

Relay implementations in previous releases, such as LTE specifications, were based on a one-to-one communication link established at upper layers (e.g., ProSe layer(s) between two WTRUs (e.g., a remote WTRU and WTRU-to-NW relay). Such connection was transparent to the AS layer, and connection management signaling and procedures performed at the upper layers are carried by AS layer data channels. The AS layer is therefore unaware of such a one-to-one connection.

In NR V2X (e.g., Release 16), the AS layer supports the notion of a unicast link between two WTRUs. Such unicast link is initiated by upper layers (as in the ProSe one-to-one connection). However, the AS layer is informed of the presence of such unicast link, and any data that is transmitted in unicast fashion between the peer WTRUs. With such knowledge, the AS layer can support HARQ feedback, CQI feedback, and/or power control schemes which are specific to unicast.

A unicast link at the AS layer is supported via a PC5-RRC connection. For example, a PC5-RRC connection is defined as follows:

"The PC5-RRC connection is a logical connection between a pair of a Source Layer-2 ID and a Destination Layer-2 ID in the AS. One PC5-RRC connection corresponds to one PC5 unicast link [xx]. The PC5-RRC signalling, as specified in sub-clause 5.X.9, can be initiated after its corresponding PC5 unicast link establishment. The PC5-RRC connection and the corresponding sidelink SRBs and sidelink DRBs are released when the PC5 unicast link is released as indicated by upper layers.

For each PC5-RRC connection of unicast, one sidelink SRB is used to transmit the PC5-S messages before the PC5-S security has been established. One sidelink SRB is used to transmit the PC5-S messages to establish the PC5-S security. One sidelink SRB is used to transmit the PC5-S messages after the PC5-S security has been established, which is protected. One sidelink SRB is used to transmit the PC5-RRC signalling, which is protected and only sent after the PC5-S security has been established."

PC5-RRC signaling includes a sidelink configuration message (e.g., RRCReconfigurationSidelink) where a WTRU configures the RX-related parameters of each SLRB in the peer WTRU. Such reconfiguration message can configure the parameters of each protocol in the L2 stack (e.g., SDAP, PDCP, and alike). The receiving WTRU can confirm or reject such configuration, depending on whether it can support the configuration suggested by the peer WTRU.

Overview

In some current implementations, an SL relay (being specified for Release 17) assumes that all data from (or for) a remote WTRU (a remote WTRU being PC5-RRC connected to a WTRU-to-NW relay) will be transmitted via the relay WTRU and assumes that Uu transmissions/receptions will not be performed. For an out-of-coverage (OOC) remote WTRU, this is a necessary consequence of the remote WTRU being OOC. For an in-coverage (IC) remote WTRU, such restriction is not necessarily needed, but is preferred for power savings and WTRU complexity considerations. For this reason, it is the preferred approach for Release 17. It is expected in Release 18, however, such restriction may be relaxed for the IC remote WTRU.

Figure 4:
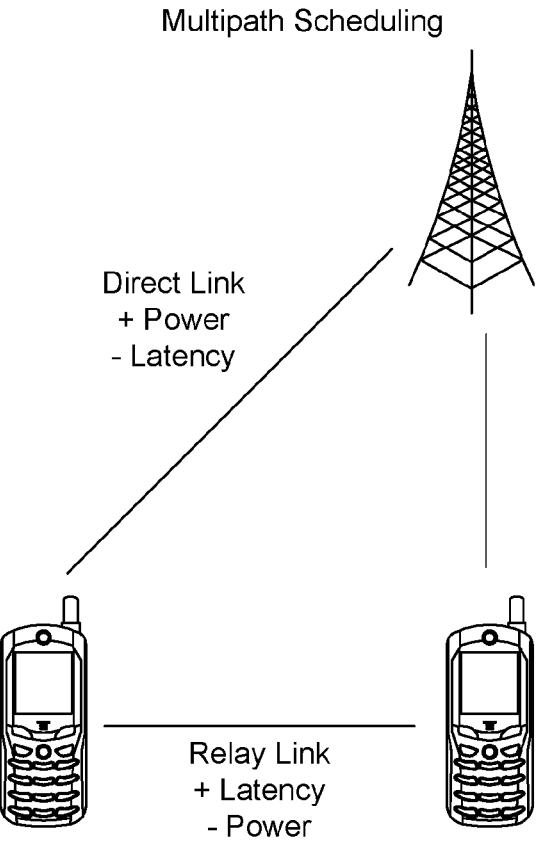
FIG. 4 is a system diagram illustrating an example of scheduling for multipath relays in a wireless network, according to one or more embodiments.

Referring to FIG. 4, while relaxing such restriction provides two separate paths for data to be transmitted to/from a remote WTRU, using both paths may eliminate some benefit of power savings of using a relay WTRU. It may therefore be beneficial to rely on the relayed link, but use the direct Uu link to limit Uu transmissions to only necessary transmissions (e.g., to meet QoS requirements).

Representative Procedures for Latency Reduction Over Relayed Path(s)

In various embodiments, enhanced procedures for reducing latency over relayed path(s) are provided. In an example, a remote WTRU may be configured to use mode 2 transmissions to a relay WTRU for data to be relayed to the network (e.g., a gNB). The latency associated with relaying may comprise one or more of the following operations/process: 1) data arrival at the remote WTRU triggers mode 2 resource selection; 2) the remote WTRU selects resources on SL for transmission of the data using mode 2 within a PDB configured for the data; 3) the remote WTRU transmits the data on the selected resources; 4) the relay WTRU receives the data, and routes it to the egress buffers; 5) upon adding/including the data to the egress buffers, the relay WTRU triggers SR/BSR associated with the data; 6) the network (e.g., gNB) schedules uplink (UL) grant(s) on Uu for transmission of the data at the relay WTRU; and/or 7) the relay WTRU transmits the data on the resources associated with the UL grant(s).

In one embodiment, the latency associated with the operations/process discussed above may be reduced if the remote WTRU informs or indicates the network (e.g., the gNB) of 1) the amount of data, and/or 2) timing or possible timing of transmission of that data on sidelink. The network may use this information to schedule UL grant(s) prior to the arrival of the data at the relay WTRU, which may save time (reduce the latency) associated with the SR/BSR triggers at the relay WTRU.

Figure 5:
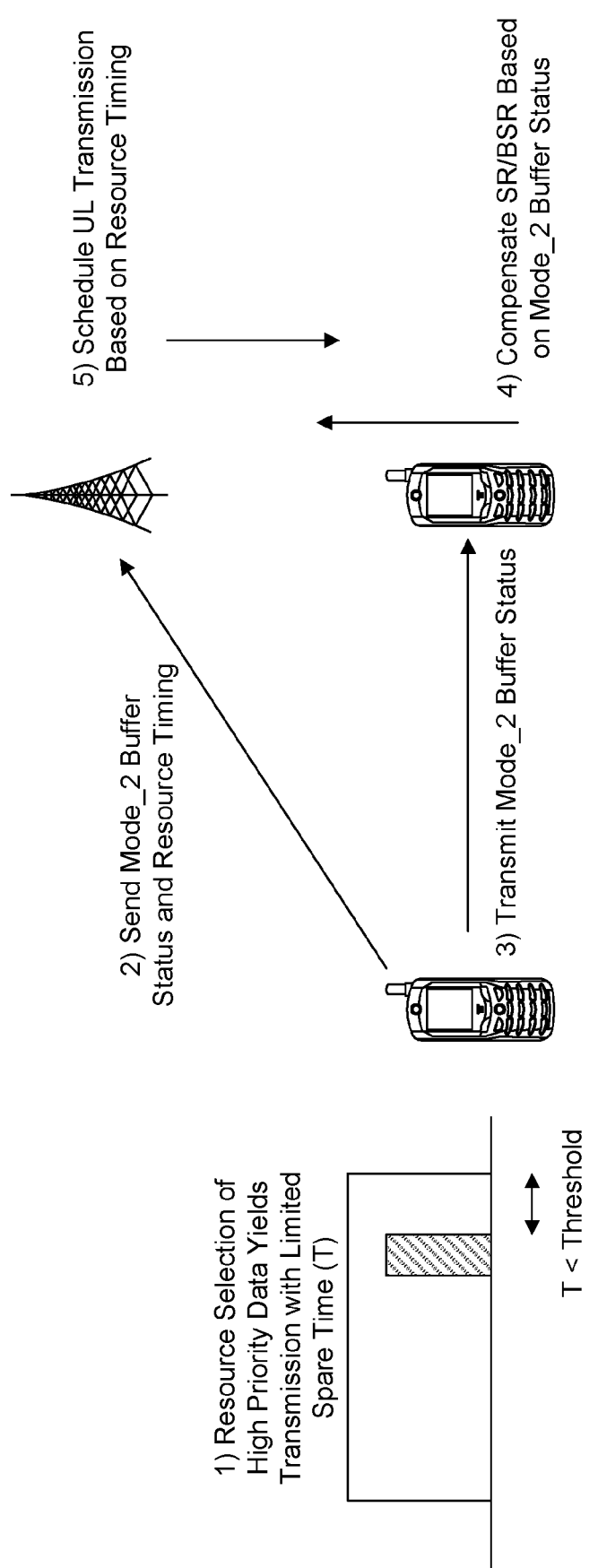
FIG. 5 a system diagram illustrating an example of a latency reduction procedure for multipath relays, according to one or more embodiments.

For example, referring to FIG. 5, an enhanced latency reduction procedure is illustrated. In this example, high priority data arrives at a remote WTRU and triggers mode 2 (or mode_2) resource selection. At step 1, if the resource selection (at the WTRU) generates a limited spare time on sidelink (e.g., the selected resources are close to the maximum Packet Delay Budget (PDB) of the data over the sidelink portion), the remote WTRU (at step 2) may send buffer status and timing of the selected resources to the network (e.g., a gNB). At step 3, the remote WTRU may send the buffer status to the relay WTRU, and the relay WTRU may take this into account in the calculation of the BSR at the relay (e.g., to avoid duplicated reporting). At step 4, the relay WTRU may disable SR/BSR and/or subtract the received buffer status (received from the remote WTRU) from its own buffer status. In an example, the relay WTRU may compensate SR/BSR based on the received mode 2 buffer status received from the remote WTRU. At step 5, the network (e.g., the gNB), following reception of the buffer status of the remote WTRU in step 2, may schedule, send, and/or indicate UL grants (for UL transmission) to the relay WTRU.

Remote WTRU Behavior

In one embodiment, a remote WTRU may provide information to the network (e.g., a gNB) about a transmission (upcoming, planned, performed, cancelled, or similar) on sidelink. Such information can serve the purpose of providing the gNB information (e.g., buffer status, and/or timing) to allow the gNB to schedule Uu transmissions to a relay WTRU for relaying the SL data in a WTRU-to-NW relay scenario. The remote WTRU may send the information in any (or a combination) of a MAC CE, an RRC message, a PUCCH transmission, SR/BSR, etc. The remote WTRU may send the information in multiple transmissions (e.g., a BSR followed by a PUCCH transmission).

The remote WTRU may send any of the following information related to a SL transmission:

Amount of data, e.g., associated with one or more logical channels (LCHs);

For example, a remote WTRU may send an amount of data possibly associated with one or more logical channels. The amount of data may correspond to any of:

The amount of data, possibly associated to one or more SL logical channels, in the UE buffers at a specific trigger point (defined herein)

The amount of data, possibly associated to one or more SL logical channels, that will be transmitted to the relay WTRU in a given PDU, number of PDUs, time window, or some similar aspect of time The amount of data, possibly associated to one or more SL logical channels, that is dropped by the remote WTRU.

The amount of data transmitted in a PDU for which transmission is upcoming, transmission is performed/dropped, HARQ feedback (e.g. NACK) is received, etc.

A time frame, or time instance associated to the planned, performed, or cancelled transmission on sidelink.

For example, the remote WTRU may provide, explicitly (e.g. through a slot number or offset transmitted to the gNB) or implicitly (e.g. by performing a transmission on PUCCH/SR whose timing indicates a timing associated with the SL transmission) any of:

The time of a transmission/retransmission that was performed on sidelink.

The time associated with a selected resource on sidelink (e.g. based on mode 2 resource selection by the remote WTRU)

The latency budget (e.g. PDB), or some function thereof, associated with data to be transmitted on one or more SL LCH An expected transmission latency on sidelink A path indication, for example, in the form of an identity of a relay WTRU to which SL transmission will be performed, was performed, was cancelled, etc.

For example, the remote WTRU may indicate the L2 destination ID (or similar identity) of the relay WTRU that serves as the destination of the transmission A carrier/pool indication providing the SL carrier, BWP, resource pool, or similar subset of resources from which the remote WTRU has selected resource for the transmission Priority of the data transmitted, to be transmitted, etc.

For example, the remote WTRU may indicate the LCH, group of LCHs, priority (e.g. maximum priority) or similar An indication about a resource selection event on SL, such as, but not limited to:

Successful/Unsuccessful resource selection

Such indication or resource selection may be determined based on sufficient, insufficient resources available for a planned transmission Indication that a previously selected/announced transmission was pre-empted/re-selected due to determination of a higher priority transmission performed by another UE Indication that a transmission (potentially planned) previously indicated to the gNB is finally performed/not performed.

For example, the remote WTRU may send such indication upon a dropped SL transmission whereby the remote WTRU drops the SL transmission due to (for example, but not limited to):

Lack of resources enabling transmission within the PDB of a packet;

Dropping of a packet due to inability to meet the packet's timing requirements; and/or Dropping of a packet due to prioritization of an UL transmission over a SL transmission.

Information about the traffic pattern of the data to be transmitted, such as the traffic pattern of the data arrival, or the periodicity/offset of the selected mode 2 resources by the remote WTRU.

For example, the remote WTRU may send traffic pattern information (e.g., in UEAssistanceInformation) from which the gNB can schedule both SL and Uu;

For example, the remote WTRU may send the periodicity and offset of mode 2 periodic resources selected by the UE. The remote WTRU may further send update to the gNB upon reselection of the resources associated with a periodic mode 2 process.

Remote WTRU is Configured with Conditions on when it can Send Information

In an example, A remote WTRU may be configured with one or more conditions which enables/disables the sending of mode 2 transmission information to the gNB. Such conditions may include conditions related to any of:

Priority (or any other QoS related parameter) of the data transmission

For example, the UE may be configured with a threshold SL priority for which it is allowed to transmit information about a mode 2 SL transmission For example, the UE may be configured, in the SL LCH configuration of each LCH, whether the specific LCH allows transmission of the information.

Timing of the transmission or planned transmission, possibly relative to a network configured absolute or relative timing, possibly representing an allocated delay budget, possibly associated with a mode 2 resource selection event For example, the remote WTRU may be provided with a threshold time difference between the PDB of a transmission on sidelink (e.g. T2 value used for resource selection) and the timing of one or more selected resource based on mode 2 resource selection. If the time between the selected resource and the PDB is below a threshold, the remote WTRU may be allowed to transmit information to the gNB For example, the remote WTRU may perform resource selection based on two different values of PDB (e.g. provided by the network), corresponding to T2_1 (safe PDB) and T2_2 (marginal T2), where T2_2>T2_1. If resource selection associated with T2_1 fails (i.e. the remote WTRU is not able to select a resource for transmission prior to T2_1), but resource selection associated with T2_2 succeeds (the selected resource occurs prior to T2_2), the remote WTRU may transmit information to the gNB SL HARQ feedback received by the remote WTRU from the relay WTRU For example, the remote WTRU may send the information following one or more (or a configured number) of SL HARQ feedback failures (e.g. NACK/DTX) in response to one or more PDU transmissions Sidelink measurements For example, the remote WTRU may be configured with conditions on the sidelink measurements for which it can/cannot send information to the gNB. For example:

The remote WTRU may be configured/allowed to send the information if the CBR is above/below a threshold.

The remote WTRU may be configured/allowed to send the information if the SL-RSRP/SL-CSI is above/below a threshold Conditions related to sensing configuration by the remote WTRU.

For example, the remote WTRU may be configured with sensing mode and/or parameters which allow sending the information, such as whether the UE is using full sensing, partial sensing, or random selection for selection of resources Conditions related to power-savings preferences at the WTRU For example, the remote WTRU may be configured with specific power savings preferences (e.g. based on the current power savings class), and may be allowed to send the information if such power saving preference is met Conditions related to sensing results at the remote WTRU.

The remote WTRU may be configured with conditions related to the output of resource selection, such as the amount/percentage of available resources, the measured RSRP of SCIs indicating available/occupied resources, the number of times resource selection is performed to find sufficient number of resources, the value of RSRP threshold used to determine the sufficient amount of resources, etc.

Explicit indication/information from the gNB

Specifically, the gNB may explicitly enable/disable transmission by the remote WTRU of the information Implicit/Explicit indication/information from the relay WTRU Specifically, the relay WTRU may provide indication/information used by the remote WTRU to determine whether transmit the information (e.g. in a discovery message, a data transmission, a PC5-RRC message, a SL MAC CE, or other protocol message such as an adaptation layer control message).

For example, the remote WTRU may determine to transmit the information based on reception of flow control messages from the relay WTRU (e.g. if the flow control messages from the relay WTRU indicate an amount of loading at the relay WTRU that is larger than a threshold).

For example, the remote WTRU may determine to transmit the information based on the RRC state of the relay WTRU (e.g. if the relay WTRU is in RRC_IDLE/RRC_INACTIVE, the remote WTRU may transmit the information).

For example, the remote WTRU may receive (e.g. in a discovery message) an indication of the buffer load or buffering latency at the relay WTRU and may transmit the information to the gNB if the load/latency is above a threshold.

For example, the remote WTRU may receive cell information (i.e. the serving cell) of the relay WTRU and may send the information when the relay WTRU serving cell matches the serving cell of the remote WTRU, or has some relationship (e.g. part of the same cell group) as the serving cell of the remote WTRU.

In an example, once a remote WTRU triggers or determines to send buffer status to the gNB, the remote WTRU may continue to do so (i.e., operating using normal BSR triggers) until one of the above conditions is no longer valid, or until indicated by the gNB.

Remote WTRU Triggers for Sending Information

The remote WTRU may transmit the information, part of the information, or trigger an SR to transmit the information to the gNB upon any of the following (possibly conditioned under the conditions above): 1) upon initiation and/or completion of resource (re) selection, possibly associated to transmission to a relay WTRU; 2) upon arrival of new data to be transmitted by the remote WTRU to the gNB; 3) Upon dropping of a transmission by the remote WTRU; 4) upon determination that a transmission by the remote WTRU will be performed after a configured PDB (packet delay budget); 5) upon reception, or absence of reception of HARQ feedback; 6) upon successful transmission of the PDU on sidelink; 7) upon fulfillment of any condition(s) mentioned herein for sending information to the gNB, possibly for a period of time, or possibly when such condition is fulfilled a number of consecutive times; 8) upon the arrival of data at the remote WTRU associated with relaying only, and of higher priority than any other data currently in the buffers and associated with relaying only; 9) upon the arrival of a certain amount of data at the UE (i.e. each time the UE receives x bytes of data); and/or 10) at a specific time (e.g., a number of slots) prior to some/all SL grants initiated by mode 2 at the remote WTRU.

Remote WTRU Sends (to the Relay WTRU) Information Intended to Control Relay WTRU Scheduling A remote WTRU, possibly in addition to transmission of information to the gNB, may send one or more scheduling adaptation messages to the relay WTRU related to the information provided to the gNB. For example, the remote WTRU may provide the same/similar (where similar is defined further by examples herein) buffer status to the relay WTRU that was provided to the network, in a scheduling adaptation message to the relay WTRU. For example, the remote WTRU may provide to the relay WTRU one or a number of scheduling adaptation messages on SL following the time in which the relay WTRU provided information to the network. The conditions for sending the scheduling adaptation message to the relay WTRU may be the same/similar to the conditions for sending information to the gNB, for instance.

A relay WTRU may provide any of the following information in the scheduling adaptation message:

Indication of whether information (e.g. buffer status or similar) was provided to the network or scheduling adaptation is required by the relay WTRU For example, following transmission of information to the gNB, the relay WTRU may include such an indication in at least one (e.g. the first) SL transmission to the relay WTRU following transmission of the indication to the network For example, for each BSR specific to mode 2 that is transmitted to the gNB, the remote WTRU may send the same buffer status amount to the relay WTRU in a scheduling adaptation message.

For example, following transmission of information to the gNB, the relay WTRU may include the indication in each PDU transmitted to the relay WTRU where data associated with the reported buffer status (to the gNB) is included For example, a relay WTRU may send a first indication (possibly with buffer status) when the relay has initiated sending of the buffer status for mode 2 data to the network, and may send a second message when it stops sending of buffer status of mode 2 data to the network The amount of data (buffer status) that was reported to the gNB, or the amount of data associated with the relayed data that was reported to the gNB For example, the remote WTRU may determine the amount of data in the BSR that was sent to the gNB that is associated with relayed SL LCHs (i.e. SL LCHs containing data that is intended to be transmitted to the gNB), and send this amount to the relay WTRU For example, the remote WTRU may differentiate, in the scheduling adaptation message, the SL data amount intended for relaying to the gNB from other SL data amount (e.g. intended for the relay WTRU directly)

In various embodiments, the scheduling adaptation message may be (or comprise, or be included in) any of: 1) a PC5-RRC message, 2) a MAC CE, 3) an adaptation layer control PDU, and/or 4) Sidelink Control Information (SCI). Remote WTRU Initiates/Requests NW-Based Scheduling Upon One of the Triggers Discussed Herein In one embodiment, the remote WTRU, following one of the triggers described above for transmission of information to the gNB, may instead change allocation mode. Specifically, the remote WTRU may request, or initiate mode 1 allocation. The remote WTRU may initiate mode 1 operation by transmission of a message to the gNB (e.g., an BSR, an RRC message, or an SR). Such message may explicitly indicate the request to move to mode 1. Such message may include an indication of the reason (e.g. resource selection event, or other trigger mentioned herein). Alternatively, such message may implicitly indicate the request to move to mode 1. Specifically, the remote WTRU may transmit a SL BSR, different BSR type, or may transmit a Uu BSR including SL logical channel buffer status. Alternatively, the remote WTRU may transmit an SR. Such SR may be reserved for indicating the request to move to mode 1. The remote WTRU may then be allowed transmit the SL BSR following the SR request.

A remote WTRU may temporarily disable mode 2 transmissions following request to use mode 1. Specifically, the remote WTRU may cancel all mode 2 SL grants. The remote WTRU may rely on mode 1 for transmission of subsequent data currently in transmit buffers. The remote WTRU may initiate transmission of UEAssistanceInformation (to provide the periodicity, offset, etc.) to the network. The remote WTRU may disable sensing and resource selection, or may continue sensing operation but not perform any resource selection. The remote WTRU may disable mode 2:

Until explicit indication by the gNB

Until the condition which initiated mode 1 operation is alleviated

For example, the remote WTRU may perform another transmission to inform the gNB that such condition is alleviated Until transmission of one or more PDU, or a certain amount of data is completed For example, the remote WTRU may resume mode 2 operation following transmission of the PDU(s) or the data in the buffer that caused initiation of mode 1

Relay WTRU Behavior

In various embodiments, methods and procedures are described in which a relay WTRU may modify its Uu transmission behavior upon reception of a message/indication/information/data from a remote WTRU.

Specifically, a relay WTRU may perform the behavior(s) described in this section for all data forwarded on Uu that was received on SL with an indication (e.g. a MAC CE was included in the PDU). Alternatively, a relay WTRU may perform the behavior(s) described in this section for a period of time from the time in which the indication/message was received from the remote WTRU. Following expiry of the time, and assuming no additional messages received by any remote WTRU, the relay WTRU may disable such behavior. Alternatively, the relay WTRU may enable such behavior until reception of a further indication/message from the remote WTRU that disables such behavior.

Relay WTRU Adapts SR/BSR Behavior

In one embodiment, a relay WTRU may receive a message on sidelink (e.g., from a remote WTRU) which adapts its SR/BSR triggers/behavior/calculation. Such message may be a PC5-RRC message, an SL MAC CE, an adaptation layer control PDU, SCI, or similar message. Specifically, a relay WTRU may avoid triggering SR for data, or may reduce the amount of data reported in the BSR, based on information received in a SL message from one or more remote WTRUs.

Upon reception of such message, a relay WTRU may modify SR/BSR as follows:

SR that would normally be triggered is not triggered or is cancelled

For example, a relay WTRU may avoid triggering a Uu SR upon arrival of data to a Uu LCH if the Uu LCH carries data (i.e. via adaptation layer mapping) associated with only SL-LCHs. On the other hand, if the Uu LCH can carry data from either SL LCH or Uu data of the relay itself, the relay WTRU may perform SR as normal, or may not trigger the SR is the PDU received from the adaptation layer that would normally trigger the SR was received from the adaptation layer For example, a relay WTRU may avoid triggering a Uu SR if the Uu data was obtained from SL data coming from a remote WTRU that send such a message. On the other hand, if the data that would normally trigger the SR is received from another UE not sending the message, the relay WTRU may still trigger SR. The priority of the triggered SR would be associated with the highest priority data received from any remote WTRU not sending the message BSR may be cancelled For example, a relay WTRU may cancel transmission of a BSR, or may remove buffer status from a Uu BSR associated with a Uu logical channel. Such may be the behavior if the Uu LCH is question is configured (i.e. by the adaptation layer) to carry only data received from a single remote WTRU and that remote WTRU sends the message, or if the Uu LCH contains data received only from remote WTRU(s) that send the message.

BSR may be deprioritized

For example, a relay WTRU may send Uu BSR with a lower priority, for example, only in the case where the Uu BSR contains buffer status related to a Uu LCH containing data received from remote WTRU(s) that transmitted the message BSR may be recomputed by accounting for amount of data received by a remote WTRU For example, a relay WTRU may subtract, from the buffer status associated with a Uu LCH, the portion of that buffer status received from the SL LCHs coming from the remote WTRU that sent the message Additional information may be sent in the Uu BSR For example, a relay WTRU may, in addition to the buffer status for a Uu LCH, send the amount of data buffer status associated with an amount received from one or more remote WTRUs (i.e. whereby such amount is obtained from information received in the message received from the remote WTRU)

Relay WTRU Enables/Disables LCP Restriction Associated With a CG

In one embodiment, a relay WTRU may enable (i.e. apply) an LCP restriction associated with a Uu configured grant upon reception of such a message from the remote WTRU. Specifically, the relay WTRU may be configured with an LCP restriction allowing only one or more relayed Uu LCHs to use one or more Uu CGs. Such restriction may apply only following reception of the indication by a remote WTRU. Specifically, upon indication received from a remote WTRU, the relay WTRU may allow only Uu LCHs associated with relaying (and possibly no other LCHs), or may disallow some/all non-relayed LCHs to use the CG. Alternatively, the relay WTRU may disallow some/all relayed LCHs which do not have data associated with a message received from a remote WTRU to use the CG.

Relay WTRU Prioritizes UL Transmissions Related to Relayed Data

In one embodiment, a relay WTRU may perform any operation associated with prioritizing the Uu LCHs which are associated (by adaptation layer mapping) to SL-LCHs coming from remote WTRU(s) that have sent a message. This may include any of: 1) increasing/replacing the Uu LCH priority for LCP; 2) prioritizing the Uu LCH over retransmissions, or prioritizing the Uu LCH retransmissions over other LCH transmissions; and/or 3) increasing/replacing the CAPC (channel access priority class) for the LCH when operating in unlicensed Uu, or temporarily modifying any LBT parameters associated with COT sharing or COT initiation by the relay WTRU.

Relay WTRU Pre-Empts an UL Transmission to Favor a Relayed Transmission

In one embodiment, upon reception of an indication from a remote WTRU, and possibly other conditions (e.g. priority, timing information from the indication, network configuration, etc), the relay WTRU may preempt an UL transmission to replace it with transmission of a PDU associated with data from the concerned relayed Uu LCH. For example, a relay WTRU may preempt transmission in an UL repetition grant after a certain number of repetitions when data is received for a Uu LCH associated with relaying and associated with a remote WTRU having sent a message. The UE may further perform such preemption if the remaining number of repetitions in a grant is above a threshold.

Relay WTRU may Enable/Use a Configured Grant

In one embodiment, upon reception of an indication from a remote WTRU, the relay WTRU may enable a configured but disabled configured grant, or a configured grant not previously being used by a relay WTRU. The relay WTRU may further send indication of enabling the configured grant, such as transmission of a RACH, a MAC CE, SR, PUCCH, or similar UL transmission to notify the network of the use of such configured grant (CG).

Relay WTRU may Indicate Non-Usage of a Uu Grant

In various embodiments, the relay WTRU may be scheduled with a Uu grant in anticipation for relayed data, but may not receive such data (e.g., based on indication received from the relay WTRU). In such case, a relay WTRU may cancel such grant by sending a grant cancellation to the network, possibly in the UL grant itself. Specifically, if the grant is associated with multi-TTI repetition, the relay WTRU may inform the network of cancellation of the grant if it receives indication from the relay WTRU (or determines that the relayed data will not arrive) while at least a certain number of repetition resources are still pending (i.e. are in the future).

Representative Procedures for Path Selection Between Direct and Indirect Path(s)

Remote WTRU Decides Whether to Perform a Uu Transmission via Direct Indirect (Relayed) Path In one embodiment, a relay WTRU may determine whether to perform UL data transmission on Uu (direct path) or SL (relayed path) based on one or more factors described herein. Determining whether to perform UL data transmission, herein, may depend on the modeling of the Uu logical channels (whether relayed or direct). Specifically, in a PDCP split modeling (e.g., a single PDCP entity for a bearer that has separate RLC entities—one transmitted on direct, and one on indirect), determining whether to perform UL data transmission may comprise the remote WTRU routing a PDU to one RLC entity vs another (SL RLC entity or Uu RLC entity). In a PDU duplication modeling (i.e. each PDU is always duplicated) the WTRU may determine whether to transmit a SL MAC PDU, a Uu MAC PDU, or both. Embodiments in this section may apply to any of these models. Furthermore, without loss of generality, determining whether to perform transmission on SL or Uu may further comprise determining the amount/proportion of data (possibly associated with a bearer) to transmit on SL vs Uu and/or the time in which transmission is performed entirely over SL or Uu. For example, a WTRU may transmit a specific proportion of data on Uu vs sidelink based on a factor below having a first outcome (e.g. SL measurements within a first range) and transmit a second proportion of data on Uu vs. SL based on the factor having a second outcome (e.g., SL measurements in a second range).

A relay WTRU may decide to transmit on SL or Uu based on one or a combination of factors (where combination may include and/or, but without loss of generality, may also comprise using one factor to determine the conditions for transmission associated with another factor):

DRX behavior of the SL or Uu

For example, a remote WTRU may transmit on Uu, possibly for certain data or logical channels only, if the SL with the relay WTRU is configured with DRX For example, a remote WTRU may transmit on Uu during the SL DRX inactive time, possibly for certain data or logical channels only (for example, only for data in which the timing requirements would not be met due to lack of active time on SL)

RRC state of the relay WTRU

For example, a remote WTRU may transmit on Uu if the relay WTRU is in RRC_INACTIVE or RRC_IDLE (based on implicit/explicit indication of such received from the relay WTRU)

For example, if data arriving at the remote WTRU is associated with a configured LCH or priority and the relay WTRU is in RRC_INACTIVE/RRC_IDLE, the remote WTRU may transmit on Uu, otherwise, it may transmit on SL UL/SL Prioritization decision following conflict of UL and SL transmission For example, if a remote WTRU is required to drop sidelink transmission due to prioritization between UL and SL, it may perform the transmission of the Uu data on the same link being prioritized QoS of the data For example, a remote WTRU may be configured with a preferred link (Uu or SL) for a specific LCH, QoS flow, priority, or similar QoS parameter For example, a remote WTRU may determine whether to use Uu or SL based on the priority (use Uu for priority>X) or configuration (use Uu if configured to for an LCH), possibly in combination with other factors (e.g. SL measurements). For example, a remote WTRU may be configured, possibly for each specific bearer, with a rule associated with another factor (e.g. SL measurements, CBR, etc) for which to use Uu (e.g. CBR>threshold) or SL (CBR<threshold)

For example, certain bearers (e.g. SRB) may be configured to be transmitted only on one link depending on other factors herein SL measurements For example, a remote WTRU may be configured with a rule related to SL CBR, SL RSSI, SL RSRP, SL CSI, or any similar SL measurements, as to whether to use SL or Uu, possibly for a specific bearer or data associated with specific QoS. For example, SL measurements being above/below a threshold, or within a specific range Distance/Location—potentially relative to the relay WTRU For example, a remote WTRU may be configured with a location (e.g. set of coordinates, a zone configuration, or similar) in which the remote WTRU should use or prioritize Uu or SL For example, a remote WTRU may be configured to use Uu if the distance between the relay WTRU and the remote WTRU is larger than a configured threshold, and use SL otherwise SL sensing configuration and/or results For example, similar triggers (e.g. amount of available resources over a time period) and/or configuration (e.g. partial sensing vs full sensing) of sensing may be used to determine whether a transmission is performed on Uu or sidelink.

For example, if the selected resource (based on mode 2 resource selection) occurs before a threshold, transmit on Uu, otherwise, transmit on SL For example, if the average amount of resources determined available within the latency in mode 2 resource selection is above a threshold, transmit on SL Configured SL transmission mode (mode 1 vs mode 2)

For example, a remote WTRU may be configured to use Uu only, possibly for specific data or bearer, when configured with mode 2 on SL For example, a remote WTRU may be configured with different rules, thresholds, conditions on whether to use Uu or SL, depending on whether SL is configured with mode 1 or mode 2

Flow control messages received from relay WTRU

For example, a remote WTRU may be configured to use Uu when it receives flow control messages from a relay WTRU, possibly associated with a certain value of buffer load, latency, etc. For example, if a flow control message indicates a value above a threshold, the remote WTRU may be configured to use Uu, possibly for a specific bearer or QoS of data.

For example, a remote WTRU may transmit data, or change the proportion of data transmitted, over Uu for a period of time after reception of a flow control message (e.g. indicating excessive load at the relay WTRU) and may alleviate such rule after such time expires, or after indication by the relay WTRU that the condition has been addressed.

Whether Uu and/or SL is licensed or unlicensed, and/or whether channel acquisition is possible For example, a remote WTRU may transmit on Uu, possibly associated with a specific bearer, if the SL uses shared spectrum (or vice versa)

For example, a remote WTRU may transmit on Uu if the remote WTRU is unable to acquire/share a COT on sidelink (or vice versa)

Based on quality of the Uu link seen by the relay WTRU (received by the remote WTRU from the relay WTRU).

For example, a remote WTRU may select Uu, possibly for some data, if the quality of the Uu link seen by the relay is below a threshold.

For example, a remote WTRU may determine a latency budget corresponding to Uu (e.g. preconfigured) for a specific received Uu quality and may transmit on Uu or SL depending on whether the latency budget is above/below a threshold, possibly associated with the logical channel Based on the grant which arrives first, or is best tailored to the timing of the data arrival For example, a remote WTRU may choose to transmit on the link in which the grant is earlier For example, a remote WTRU may select the link for which the configured grant is best aligned with the timing of the data arrival at the WTRU Based on RLF status or SL HARQ feedback For example, a remote WTRU may transmit on Uu if it detects SL RLF For example, a remote WTRU may transmit on Uu if it receives RLF indication from a relay WTRU.

For example, a remote WTRU may transmit on Uu based on partial RLF statistics (for example, the number of consecutive HARQ DTX from a relay WTRU reaches a threshold)

For example, a remote WTRU may transmit on Uu when the number of consecutive HARQ NACK from the relay WTRU reaches a threshold Based on which link minimizes the latency For example, the remote WTRU may be configured with a latency over SL (e.g. the PDB to use for particular data) as well as a configuration or rule for determining the latency on Uu, as well as the latency on the Uu link of the relay WTRU. Alternatively, the relay WTRU or the network may send the equivalent latency on the Uu link between the relay and the gNB. The remote WTRU may determine whether to transmit on Uu or SL based on comparison of the latencies on either path, specifically, this may be:

Transmit on the link with the smaller latency

Transmit on Uu if the latency is more/less than the latency on SL by an offset (where the offset can be configured based on any other factor herein)

Transmit a proportion of data on SL or Uu that relates to the difference in latency between SL path and Uu.

If the SL latency is less than the total configured latency (possibly associated to a bearer or QoS) by an amount, transmit on SL, otherwise transmit on Uu. The amount in question may further depend on another factor herein Remote WTRU Triggers a Scheduling Activity on One Link When it Decides to Change the Path In one embodiment, a remote WTRU may trigger a scheduling activity upon a change in the decided link for transmission of a packet, data from a bearer, etc., or upon change in the proportion of data transmitted over each link. The WTRU may further provide the network with information about such change (e.g. the new proportion, indication of the change, or reason for the change).

A remote WTRU may perform any of the following to trigger a scheduling activity: 1) perform resource or carrier (re)selection associated with mode 1, and/or 2) trigger Uu or SR/BSR. In addition to the change in factors described above, the WTRU may trigger a scheduling activity following any of: pre-emption or re-evaluation of a reserved resource; planned dropping of a transmission due to UL/SL prioritization; reception of one or more HARQ NACK on a specific link, possibly associated with the same PDU; transmission/reception of a SL DRX or Uu DRX command indicating to move to DRX inactive; and/or RLF failure detection or reception of such indication.

Remote WTRU Sends a Flexible BSR

In one embodiment, a WTRU may be configured with a new BSR type, reporting data which can be flexibly transmitted over either Uu or SL for multipath transmission. For example, a remote WTRU may be configured with a subset of bearers for which flexible BSR can be reported. In some cases, the remote WTRU may include, in such flexible BSR, only the data in the RLC buffers associated with these bearers.

A remote WTRU may report either the SL BSR (i.e., the buffer status in the SL RLC channels associated with such bearers), or report the Uu BSR (i.e., the buffer status in the Uu RLC channels associated with such bearers), or report both SL BSR and Uu BSR. For example, the remote WTRU may duplicate all data on both SL and Uu, and report BSR for the RLC channels for SL and Uu using the same MAC CE.

Representative Procedures for Scheduling of Multipath Relays

In one embodiment, an SL remote WTRU sends a buffer status specific to mode 2 data transmissions to the gNB, and informs a relay WTRU of such, based on the priority of the data and the timing of the selected mode 2 resources. For example, the SL remote WTRU may be configured with a threshold priority level, and threshold time remainder in the resource selection window (i.e. time difference between PDB and the selected resource). If data arrives for one or more logical channels with priority greater than the threshold, and resource selection selects resources for that data such that the threshold time remaining is less than a threshold. The SL remote WTRU may send a MAC CE to the gNB, containing the mode 2 data buffer status for the configured LCHs, and the timing of the selected resource, to the gNB. The SL remote WTRU may include the mode 2 data buffer status in the sidelink transmission to the relay WTRU.

In another embodiment, an SL relay WTRU may compensate SR/BSR for data to be relayed to the gNB based on indication from the remote WTRU. For example, the SL relay WTRU may be configured with an adaptation layer mapping ingress LCHs to egress LCHs. Upon reception of buffer status for mode 2 data from a remote WTRU, the SL relay WTRU may cancel any SR that would be triggered by data arrival at egress LCH(s) mapped to the ingress LCH IDs indicated in the buffer status. The SL relay WTRU may subtract an amount of data, from any future BSR for each egress LCH, corresponding to the amount of data indicated in the in the buffer status received from the remote WTRU. The SL relay WTRU may transmit BSR (based on legacy triggers) containing the compensated amount of data.

In one embodiment, an SL remote WTRU may inform the gNB about the periodicity and offset of selected mode 2 resources for transmission to the relay WTRU. For example, the SL remote WTRU may be configured with a threshold priority level, and threshold time remainder in the resource selection window (i.e. time difference between PDB and the selected resource). The SL remote WTRU may perform periodic resource selection of data to be transmitted to a relay WTRU. If resource selection performed for the periodic data is associated with a priority level before the threshold and results in a time difference between the selected resource and the PDB which is below the threshold, the remote WTRU may provide indication of a periodic resource selection and the periodicity and offset of mode 2 selected resources to the gNB.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

What is claimed is:

1. A method implemented in a wireless transmit/receive unit (WTRU) for wireless communications, the method comprising:
determining that data to be transmitted has a priority greater than a priority threshold;
determining timing information associated with a selected set of resources for transmitting the data, wherein the timing information indicates a time resource for transmitting the data is less than a time resource threshold;
transmitting, to a network entity, a first transmission including information indicating 1) a buffer status associated with the data and 2) the timing information associated with the selected set of resources; and
transmitting, to a relay WTRU, a second transmission including information indicating the buffer status associated with the data.

2. The method of claim 1, wherein the buffer status is for mode 2 data transmission.

3. The method of claim 1, wherein the time resource for transmitting the data is a time remaining portion of a time window for resource selection.

4. The method of claim 3, wherein the time remaining portion is a remaining packet delay budget (PDB) for transmitting the data.

5. The method of claim 3, wherein the time remaining portion is a time difference between a packet delay budget (PDB) and the selected set of resources for transmitting the data.

6. The method of claim 1, wherein first transmission comprises any of: 1) a medium access control (MAC) control element (CE), a radio resource control (RRC) message, an uplink control transmission, a scheduling request, or a buffer status report.

7. The method of claim 1, wherein the selected set of resources comprises one or more mode 2 resources for transmitting the data.

8. The method of claim 1, further comprising:
selecting the set of resources for transmitting the data using mode 2 data transmission, wherein the set of resources is associated with a packet delay budget (PDB).

9. The method of claim 1, wherein the data to be transmitted is associated with one or more logical channels each having a priority greater than the priority threshold.

10. The method of claim 1, wherein the buffer status is associated with one or more logical channels each having a priority greater than the priority threshold.

11. The method of claim 1, wherein the second transmission is a sidelink transmission.

12. The method of claim 1, wherein the information included in the first transmission further indicates: 1) an amount of the data, and/or 2) the timing information associated with the selected set of resources for the network entity to schedule one or more uplink grants.

13. The method of claim 1, further comprising:
transmitting, to the network entity, a third transmission including information indicating: 1) A periodic resource selection for data transmission to the relay WTRU, and 2) a periodicity and an offset of the selected set of resources.

14. A wireless transmit/receive unit (WTRU) for wireless communications, comprising circuitry, including a transmitter, a receiver,
a processor, and memory, the WTRU configured to:
determine that data to be transmitted has a priority greater than a priority threshold;
determine timing information associated with a selected set of resources for transmitting the data, wherein the timing information indicates a time resource for transmitting the data is less than a time resource threshold;
transmit, to a network entity, a first transmission including information indicating 1) a buffer status associated with the data and 2) the timing information associated with the selected set of resources; and
transmit, to a relay WTRU, a second transmission including information indicating the buffer status associated with the data.

15. The WTRU of claim 14, wherein the buffer status is for mode 2 data transmission.

16. The WTRU of claim 14, wherein the time resource for transmitting the data is a time remaining portion of a time window for resource selection.

17. The WTRU of claim 16, wherein the time remaining portion is a remaining packet delay budget (PDB) for transmitting the data.

18. The WTRU of claim 16, wherein the time remaining portion is a time difference between a packet delay budget (PDB) and the selected set of resources for transmitting the data.

19. The WTRU of claim 14, wherein the second transmission is a sidelink transmission.

20. The WTRU of claim 14, wherein the transmitter is further configured to:
transmit, to the network entity, a third transmission including information indicating: 1) a periodic resource selection for data transmission to the relay WTRU, and 2) a periodicity and an offset of the selected set of resources.

* * * * *